(12) United States Patent
Chang et al.

(10) Patent No.: US 8,799,273 B1
(45) Date of Patent: Aug. 5, 2014

(54) HIGHLIGHTING NOTEBOOKED WEB CONTENT

(75) Inventors: Bay-Wei Chang, Foster City, CA (US); Kushal Dave, New York, NY (US); Paul Fontes, Mountain View, CA (US); Benedict A. Gomes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 461 days.

(21) Appl. No.: 12/334,005

(22) Filed: Dec. 12, 2008

(51) Int. Cl.
*G06F 7/00* (2006.01)
*G06F 17/30* (2006.01)

(52) U.S. Cl.
USPC .......................... 707/722; 715/204; 715/207

(58) Field of Classification Search
None
See application file for complete search history.

(56) References Cited

U.S. PATENT DOCUMENTS

| | | | |
|---|---|---|---|
| 5,515,496 A | 5/1996 | Kaehler et al. | |
| 5,760,773 A | 6/1998 | Berman et al. | |
| 6,119,135 A | 9/2000 | Helfman | |
| 6,310,630 B1 | 10/2001 | Kulkarni et al. | |
| 6,366,923 B1 | 4/2002 | Lenk et al. | |
| 6,460,038 B1 | 10/2002 | Khan et al. | |
| 6,522,342 B1 | 2/2003 | Gagnon et al. | |
| 6,546,388 B1 | 4/2003 | Edlund et al. | |
| 6,631,496 B1 | 10/2003 | Li et al. | |
| 6,718,365 B1 | 4/2004 | Dutta | |
| 6,745,178 B1 * | 6/2004 | Emens et al. | 707/741 |
| 6,763,388 B1 | 7/2004 | Tsimelzon | |
| 6,763,399 B2 | 7/2004 | Margalit et al. | |
| 6,976,210 B1 | 12/2005 | Silva et al. | |
| 7,058,902 B2 | 6/2006 | Iwema et al. | |
| 7,206,839 B2 | 4/2007 | Ingram et al. | |
| 7,360,175 B2 | 4/2008 | Gardner et al. | |
| 7,478,336 B2 | 1/2009 | Chen et al. | |
| 7,503,012 B2 | 3/2009 | Chen et al. | |
| 7,702,811 B2 * | 4/2010 | Gopalan et al. | 709/245 |
| 2001/0044834 A1 | 11/2001 | Bradshaw et al. | |
| 2002/0065802 A1 | 5/2002 | Uchiyama | |
| 2004/0205493 A1 | 10/2004 | Simpson et al. | |
| 2004/0225716 A1 | 11/2004 | Shamir et al. | |

(Continued)

FOREIGN PATENT DOCUMENTS

| | | |
|---|---|---|
| EP | 1 030 247 | 8/2000 |
| WO | WO 01/16807 | 3/2001 |

OTHER PUBLICATIONS

Amazon Screenshot, So You'd Like to . . . Create a Guide, Retrieved from Internet, [retrieved on Mar. 22, 2006] 2 pages.

(Continued)

*Primary Examiner* — Alicia Lewis
(74) *Attorney, Agent, or Firm* — Fish & Richardson P.C.

(57) ABSTRACT

A computer-implemented method can include receiving, in a system that maintains web notebooks for a plurality of user accounts, a request for a web document from a client computing device; determining whether a portion of the requested web document is included in a web notebook associated with one of the plurality of user accounts; and when it is determined that the portion is included in a web notebook associated with one of the plurality of user accounts, providing for display by the client computing device a highlighted version of the web document having a visual indicator that highlights the portion. Determining whether a portion of the requested web document is included in a web notebook associated with one of the plurality of user accounts can include determining whether the portion is included in at least a threshold number of web notebooks associated with distinct user accounts.

24 Claims, 7 Drawing Sheets

(56) References Cited

U.S. PATENT DOCUMENTS

| | | | |
|---|---|---|---|
| 2005/0033657 A1 | 2/2005 | Herrington et al. | |
| 2005/0091609 A1 | 4/2005 | Matthews et al. | |
| 2005/0102630 A1 | 5/2005 | Chen et al. | |
| 2005/0154994 A1 | 7/2005 | Chen et al. | |
| 2005/0234904 A1 | 10/2005 | Brill et al. | |
| 2005/0246540 A1* | 11/2005 | Brown | 713/176 |
| 2006/0015498 A1 | 1/2006 | Sarmiento et al. | |
| 2006/0026147 A1 | 2/2006 | Cone et al. | |
| 2006/0085476 A1 | 4/2006 | Daniels | |
| 2006/0161859 A1 | 7/2006 | Holecek et al. | |
| 2006/0274086 A1 | 12/2006 | Forstall et al. | |
| 2006/0277460 A1 | 12/2006 | Forstall et al. | |
| 2007/0011146 A1 | 1/2007 | Holbrook | |
| 2007/0106952 A1 | 5/2007 | Matas et al. | |
| 2007/0266011 A1* | 11/2007 | Rohrs et al. | 707/3 |
| 2007/0266022 A1* | 11/2007 | Frumkin et al. | 707/5 |
| 2007/0266342 A1* | 11/2007 | Chang et al. | 715/810 |
| 2008/0046845 A1* | 2/2008 | Chandra | 715/856 |
| 2008/0086471 A1* | 4/2008 | Ritter et al. | 707/8 |
| 2008/0168388 A1 | 7/2008 | Decker | |
| 2008/0201650 A1 | 8/2008 | Lemay et al. | |
| 2008/0307301 A1 | 12/2008 | Decker et al. | |
| 2008/0307308 A1 | 12/2008 | Sullivan et al. | |
| 2009/0044138 A1 | 2/2009 | Rudolph et al. | |
| 2009/0119258 A1* | 5/2009 | Petty | 707/3 |
| 2011/0082849 A1 | 4/2011 | Rakowski et al. | |
| 2013/0212463 A1 | 8/2013 | Pachikov et al. | |

OTHER PUBLICATIONS

Amazon.com, Inc., Amazon Listmania, Copyright 1995-2005, [online], [retrieved on Mar. 22, 2006] Retrieved from Amazon.com using Internet <URL: http://www.amazon.com/gp/help/customer/display.html?-nodeId=14279651> 8 pages.

Backpack Publish Firefox Extension << Slow Burn Productions [online], [retrieved Jul. 16, 2007] Retrieved from Internet <URL: http://slowburnproductions.wordpress.com/2007/04/25/backpack-publish-firefox-extension> 4 pages.

Bluebell—Internet Scrapbook—1U5, Internet Article [Online] Feb. 26, 2002, Retrieved from the Internet: URL: http://www.download32.com/bluebell---internet-scrapbook--i22878.html> [retrieved on Oct. 25, 2007].

Citebite—Link directly to specific quotes in web pages [online], [retrieved Jul. 16, 2007] Retrieved from Internet <URL: http://www.citebite.com> 2 pages.

Clipmarks—Learn More [online], [retrieved Jul. 16, 2007] Retrieved from Internet <URL: http://www.clipmarks.com/learn-more> 4 pages.

Cogitum, L.C., Cogitum Co-Citer , Copyright 2000-2006, [online], [retrieved on Mar. 22, 2006] Retrieved from Cogitum, L.C. using Internet <URL: http://www.cogitum.com/co-tracker-text/more.shtml> 2 pages.

Dabble Video Search Launchpad [online], [retrieved Jul. 16, 2007] Retrieved from Internet <URL: http://www.http://dabble.com> 2 pages.

Diigo—Social Annotation: Seamless Integration of Social Bookmarking, Web Highlighter, Sticky-Note & Clipping [online], [retrieved Jul. 16, 2007] Retrieved from Internet <URL: http://www.diigo.com> 3 pages.

Engst, A.C., "Internet Explorer 5.0 Redisplays the Web," Internet Article [Online] Mar. 27, 2000, Retrieved from the Internet: URL: http://db.tidbits.com/articile/5872> [retrieved on Oct. 25, 2007] Paragraph titled "Keeping a Scrapbook".

eSnips—Make your life easier with eSnips Uploader [online], [retrieved Jul. 16, 2007] Retrieved from Internet <URL: http://www.esnips.com/tour/page8.jsp>1 page.

EverNote—A single place for all your notes! [online], [retrieved Jul. 16, 2007] Retrieved from Internet <URL: http://www.evernote.com/en>, 2 pages.

EverNote Corporation, EverNote products, Copyright 2006, [online], [retrieved on Mar. 22, 2006] Retrieved from EverNote Corporation using Internet <URL: http://www.evernote.com/en/products/evernote/features.php> 7 pages.

EverNote Corporation, User Manual for EverNotes Plus, Copyright 2005, [online], [retrieved on Mar. 22, 2006] Retrieved from EverNote Corporation using Internet <URL: hitp://www.evernote.com/en/products/evernote/features.php> 2 pages.

Fleck.com—Fleck the Web! [online], [retrieved Jul. 16, 2007] Retrieved from Internet <URL: http://fleck.com> 2 pages.

Giles-Peters, Andrew, ScrapBook: A Firefox extension for gathering information from the web, Dec. 2005, [online], [retrieved on Mar. 22, 2006] Retrieved from Mozilla using Internet <URL: http://www.mozilia.com/en-US/firefox/central/> 55 pages.

Google Shopping List [online], [retrieved on Jun. 18, 2007] Retrieved from Internet <URL: http://froogle.com/shoppinglist>1 page.

i-Lighter:: the yellow highlighter for the web [online], [retrieved Jul. 16, 2007] Retrieved from Internet <URL: http://www.i-lighter.com> 2 pages.

Jeteye—How to Create Your First Jetpak Jeteye.com [online], [retrieved Jul. 16, 2007] Retrieved from Internet <URL: http://www.jeteye.com/jetpak/5e065b9d-db01-4b66-a523-0f6c4667b8cf> 2 pages.

Jeteye Technologies, Inc., Jeteye beta tour, Copyright 2005, [online], [retrieved on Mar. 22, 2006] Retrieved from Jeteye Technologies, Inc. using Internet <URL: http://www.jeteye.com/>.1 page.

Kaboodle—Organize [online], [retrieved Jul. 13, 2007] Retrieved from Internet <URL: http://www.kaboodie.com/ht/img/hom/promo2.gif> 1 page.

Kaboodle—Shopping is more fun with friends [online], [retrieved Jul. 16, 2007] Retrieved from Internet <URL: http://www.kaboodle.com> , 4 pages.

Kaboodle, Inc, Kaboodle , Copyright 2006, [online], [retrieved on Mar. 22, 2006] Retrieved from Kaboodle.com using Internet <URL: http://www.kaboodle.com/zd/help/learnhow.html> 5 pages.

Koonji—How to Use it [online], [retrieved on Aug. 31, 2007] Retrieved from Kaboodle.com using Internet <URL: http://www.koonji.com/learnMore.htm, 9 pages.

Lifehacker—Create a store and earn commissions with Zlio—Lifehacker [online], [retrieved Jul. 16, 2007]Retrieved from Internet <URL: http://www.lifehacker.com/software/sales/creat-a-stor-and-earn-commissions-with-zlio-234655.php> 7 pages.

Macropool GmbH, Content Saver , Copyright 2006, [online], [retrieved on Mar. 22, 2006] Retrieved from Macropool GmbH using Internet <URL: http://www.macropoo.com/en/products/contentsaver/irldex.html> 2 pages.

Manber, U. "Creating a Personal Web Notebook," *Proceedings of the Usenix Symposium on Internet Technologies and Systems*, Dec. 11, 1997, pp. 183-191, Monterey, CA, USA, Retrieved from the Internet: URL: http://www.usenix.org/publications/library/proceedings/usits97/full_papers/manber_creating/manber_creating.pdf .[retrieved on Oct. 24, 2007] abstract.

Microsoft Corporation, How to change the placement of your notes in OneNote 2003, Last Review date Aug. 5, 2004, Copyright 2006, [online], [retrieved on Mar. 22, 2006] Retrieved from Microsoft Corporation using Internet <URL: http://supportmicrosoft.com/kb/822567> 3 pages.

Microsoft Corporation, Onfolio Add-in for Windows Live Toolbar, Copyright 2002-2006, [online], [retrieved on Mar. 22, 2006] Retrieved from Microsoft Corporation using Internet <URL: http://www.onfolio.com/product/toolbaraddin/> 2 pages.

Net Snippets Ltd, Net Snippets Maximizing Online Research , Copyright 2001-2005, [online], [retrieved on Mar. 22, 2006] Retrieved from Net Snippets Ltd using Internet <URL: http://www.netsnippets.com/professional.htm> 4 pages.

Notemark: Your Personal Save Engine, [online], [retrieved on Jul. 16, 2007] Retrieved from Notemark using Internet <URL: http://www.notemark.com/how_it_works.php> 8 pages.

Omni Group—OmniOutliner [online], [retrieved Jul. 16, 2007] Retrieved from Internet <URL: http://www.omnigroup.com/applications/omnioutliner> 5 pages.

Plum Ventures, Inc., Plum, Copyright 2006, [online], [retrieved on Mar. 22, 2006] Retrieved from Plum Ventures, Inc. using Internet <URL: htrp://www.plum.com/heip.plum>12 pages.

(56) References Cited

OTHER PUBLICATIONS

Plum: Welcome to Plum [online], [retrieved Jul. 16, 2007] Retrieved from Internet <URL: http://www.plum.com> 2 pages.
PreFound—Download PFfinder [online], [retrieved Jul. 16, 2007] Retrieved from Internet <URL: http://www.prefound.com/pffinder.php> 2 pages.
Reimer, Y. J. et al., "Implementation Challenges Associated with Developing a Web-based E-notebook," *Journal of Digital Information* [Online]vol. 4 No. 3, 2004, ISSN: 1368-7506, Retrieved from the Internet URL:http://jodi.ecs.soton.ac.uk/Articles/v04/i03/JacobsReimer/. [retrieved on Oct. 24, 2007] section 3 "NetNotes: A Web-based E-notebook".
SharedCopy [online], [retrieved Jul. 16, 2007] Retrieved from Internet <URL: http://www.sharedcopy.com> 16 pages.
Stickis [online], [retrieved Jul. 16, 2007] Retrieved from Internet <URL: http://www.stickis.com> 1 page.
Sugiura, A. et al. "Internet Scrapbook: Automating Web Browsing Tasks by Demonstration," *Proceedings of the 11th Annual Symposium on User Interface Software and Technology*, Nov. 1-4, 1998, pp. 9-18, San Francisco, CA, USA, ISBN: 1-58113-034-1.
Summarizing Personal Web Browsing Sessions [online], [retrieved Jul. 16, 2007] Retrieved from Internet <URL: http://www.cs.washington.edu/homes/mirad/researeh/summaries> 2 pages.
Tably [online], [retrieved Jul. 16, 2007] Retrieved from Internet <URL: http://www.tably.com/defaulttab.asp> 1 page.
Trailfire [online], [retrieved Jul. 16, 2007] Retrieved from Internet <URL: http://www.trailfire.com> 4 pages.
Tucows Downloads—WebStasher 1.5 Shareware Software [online], [retrieved Jun. 18, 2007] Retrieved from Internet <URL: http://www.tucows.com/preview/319605>, 5 pages.
Uhuroo—Help Kaboodle [online], [retrieved Jul. 16, 2007] Retrieved from Internet <URL: http://www.uhuroo.com/uweb/html/help/htm> 5 pages.
WebWorkshop—Google's PageRank Explained [online], [retrieved Mar. 23, 2006] Retrieved from Internet <URL: http://webworkshop.net/pagerank.html?prn=y, 15 pages.
Welcome to webOutliner [online], [retrieved Jul. 16, 2007] Retrieved from Internet <URL: http://www.weboutiner.com> 2 pages.
Wists, Wists social shopping beta, [online], [retrieved on Mar. 22, 2006] Retrieved from wists.com Internet <URL: www.wists.com> 3 pages.
Wridea [online], [retrieved Jul. 16, 2007] Retrieved from Internet <URL: http://www.wridea.com>3 pages.
Yoono, People Powered [online], [retrieved Jul. 16, 2007] Retrieved from Internet <URL: http://www.yoono.com/index.jsp> 1 page.
Zoho Notebook Press Release [online], [retrieved Aug. 31, 2007] Retrieved from Internet <URL: http://mashable.com/2007/05/21/zoho-notbook > 1 page.
Zotero—The Next-Generation Research Tool [online], [retrieved Jul. 16, 2007] Retrieved from Internet <URL: http://www.zotero.org>, 5 pages.
International Search Report & Written Opinion, PCT/US2007/068662, mailed Oct. 31, 2007 13 pages.
International Preliminary Report on Patentability & Written Opinion, PCT/US2007/068695, mailed Nov. 20, 2008, 8 pages.
International Search Report & Written Opinion, PCT/US2007/068662, mailed Nov. 6, 8007, 12 pages.
International Preliminary Report on Patentability & Written Opinion, PCT/US2007/068662, mailed Nov. 20, 2008, 7 pages.
International Search Report & Written Opinion, PCT/US2007/068709, mailed Nov. 8, 2007, 14 pages.
International Preliminary Report on Patentability & Written Opinion, PCT/US2007/068709, mailed Nov. 20, 2008, 8 pages.
Notification of Second Office Action, Chinese Appl. No. 200780026084.4, issued Apr. 14, 2011, 26 pages.
European Patent Office Action, Appl. No. EP 07 762 103.5, mailed Mar. 18, 2009, 4 pages.
Notification of First Office Action, Chinese Appl. No. 200780026084.4, issued Jul. 12, 2010, 24 pages.
CN Office Action in Application No. 200780026182.8, mailed Nov. 22, 2010, 14 pages.
Susan Dumais et al. "Stuff I've Seen: A System for Personal Information Retrieval and Re-Use," Microsoft Research, Redmond, WA, 2003, 8 pages.
Decision on Rejection, Chinese Appl. No. 200780026084.4, issued Sep. 21, 2011, 18 pages.
European Examination Report, EP 07 783 616.1, mailed Jan. 4, 2012, 4 pages.
CN Office Action in Application No. 200780026182.8, issued Nov. 23, 2011, 17 pages.
CN Office Action in Application No. 201010567887.4, issued Apr. 26, 2012, 4 pages.
CN Office Action in Application No. 201010567887.4, issued Mar. 19, 2013, 7 pages (with English translation).
CN Office Action in Application No. 201010567887.4, issued Sep. 29, 2013, 10 pages (with English translation).

* cited by examiner

HIGHLIGHTING NOTEBOOKED WEB CONTENT

TECHNICAL FIELD

This document relates to managing and accessing data relating to online notebooks.

BACKGROUND

Users of various networks (e.g., the World Wide Web, or "web;" or the internet) can locate all forms of information, from travel guides to restaurant home pages. To help locate desired information, a user may employ a search engine that receives from the user a search query and provides in response one or more search results. The user may select a particular search result and be taken to a corresponding web page, which may contain desired information. After browsing content from various sources, the user may wish to return to content previously accessed.

One way a user can return to previously accessed content is by employing a "history" or "favorites" feature of a browser. Another way a user can return to previously accessed content is by maintaining a web notebook. Web notebooks can allow a web user to organize web-based information in an electronic document configured to store portions of content from various web documents. For example, someone remodeling a home may create and maintain a web notebook related to remodeling by browsing a number of web sites related to different aspects of remodeling and "clipping" (e.g., electronically copying) small portions of content from several of the web sites. Subsequently, the home remodeler can refer to the previously accessed content by accessing the web notebook, rather than having to return to each of several individually accessed sites.

SUMMARY

Users can employ web notebooks to log various websites that have been visited and to save portions of content from the various websites in a particular location (e.g., a network-accessible web notebook. Some users may employ multiple web notebooks to organize content from various sources related to a particular subject. Users may share web notebooks with other web notebook users, for example, by designating their notebooks as publicly accessible. To enhance a user's experience of browsing for web content, web content can be highlighted when it has been previously included in the user's own web notebook, or in the web notebook of another user (e.g., content that has been previously "clipped" or "notebooked"). In this manner, the user can be notified of information that he or she, or another user, has previously found interesting or relevant enough to clip. Such notification can help users find relevant content, since content that has previously been clipped may be more likely to be relevant or interesting than content that has not been previously clipped.

In some implementations, a web page may be displayed by a web browser to a user upon the user selecting a navigable link. A background application, which can be an application or part of an application not normally visible to the user, can operate on a system, such as the system running the web browser application. The background application may display parts of the content of the web page in a visually distinct manner, for example, by highlighting a particular part of the web page distinguishing it from other parts of the web page. The highlighting can indicate that the highlighted information is included in at least one other user's web notebook, or in a notebook maintained for the user himself or herself.

In some implementations, a computer-implemented method can include receiving, in a system that maintains web notebooks for a plurality of user accounts, a request for a web document from a client computing device; determining whether a portion of the requested web document is included in a web notebook associated with one of the plurality of user accounts; and when it is determined that the portion is included in a web notebook associated with one of the plurality of user accounts, providing for display by the client computing device a highlighted version of the web document having a visual indicator that highlights the portion. Determining whether a portion of the requested web document is included in a web notebook associated with one of the plurality of user accounts can include determining whether the portion is included in at least a threshold number of web notebooks associated with distinct user accounts.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Users can employ web notebooks to log various websites that have been visited and to save portions of content from the various websites in a particular location (e.g., a network-accessible web notebook. Some users may employ multiple web notebooks to organize content from various sources related to a particular subject. Users may share web notebooks with other web notebook users, for example, by designating their notebooks as publicly accessible. To enhance a user's experience of browsing for web content, web content can be highlighted when it has been previously included in the user's own web notebook, or in the web notebook of another user (e.g., content that has been previously "clipped" or "notebooked"). In this manner, the user can be notified of information that he or she, or a another user, has previously found interesting or relevant enough to clip. Such notification can help users find relevant content, since content that has previously been clipped may be more likely to be relevant or interesting than content that has not been previously clipped.

Figure 1:
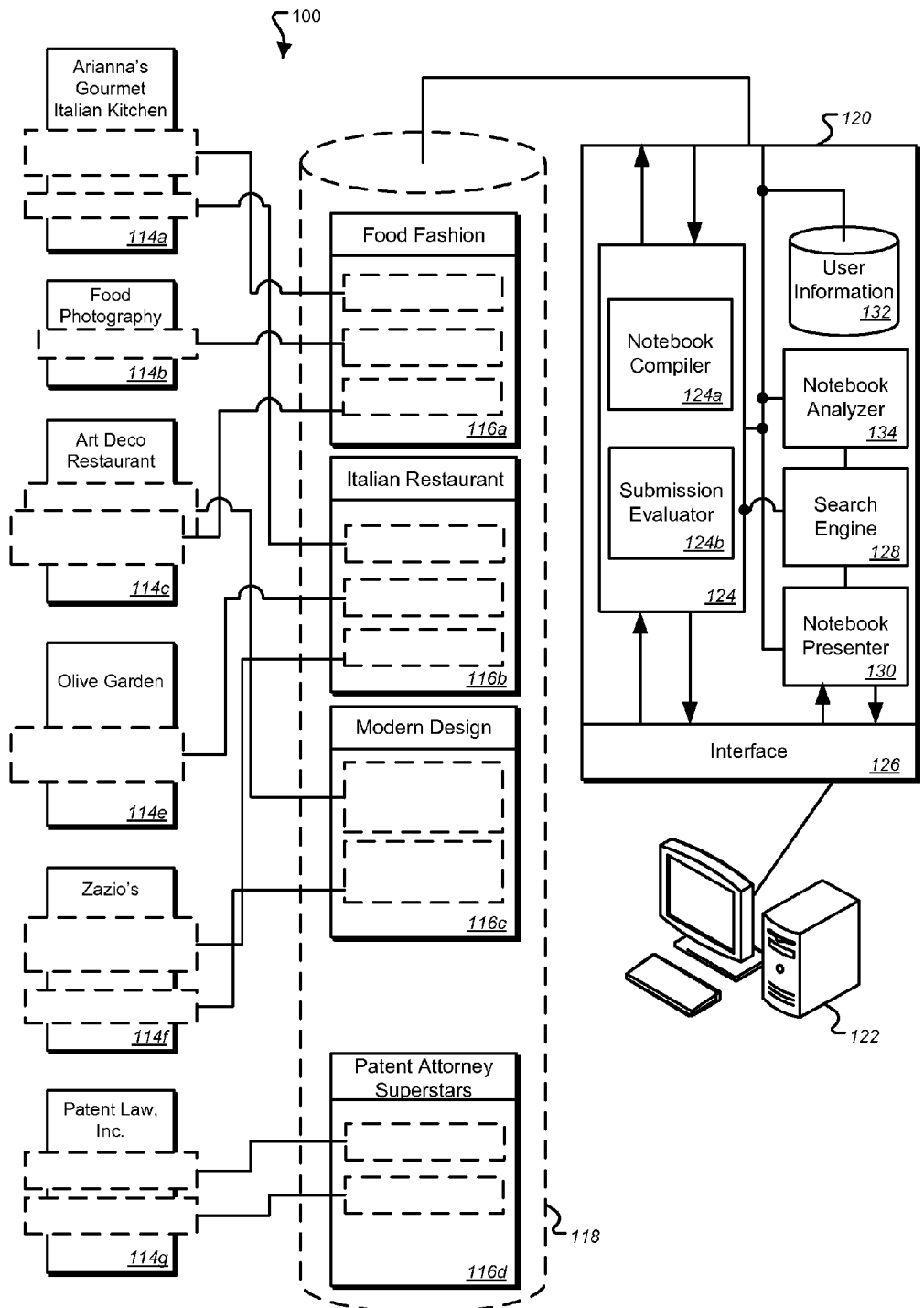
FIG. 1 is a block diagram of an example system for organizing web-based content into web notebooks.

FIG. 1 is a block diagram of an example system 100 for organizing web-based content in web notebooks (e.g., electronic, network-accessible documents). In general, the system 100 organizes notebooks 116a-116d in a notebook database 118 when users of the system 100 select content from web pages 114a-114g. A notebook manager 120 contains components to permit creation, modification, and management of notebooks, and access to the notebooks by users and others. As pictured in one example, the system 100 employs a hosted notebook arrangement in which at least a substantial portion of the notebook information is stored on one or more central servers rather than being stored at each user's computer. In other implementations, the system can have a different arrangement (e.g., a distributed arrangement).

The web pages 114a-114g can be prepared, for example, by various third parties and can be located by users of the system 100, for example, by the users browsing the web. The notebooks 116a-116d are compiled documents prepared by users of the system, and are, in essence, conglomerations or compilations of other information from various sources that the users grouped together. They are compiled in the sense that some or all of their content may originate from other sources, such as web pages. For example, a user may compile a web notebook to include information from various retail stores' web pages showing store hours for Black Friday—the day after Thanksgiving.

Such compiled content may be more helpful to readers than links to the retailers' own web pages because the notebook allows review of the information in a single page, without the need for navigating between and among various pages. In addition, links to the retailer's own web pages might not take the viewer directly to the relevant content—even if the links lead to areas within a web page—because the viewer may be distracted by information they see around the relevant content. By clipping a portion of the web page content, a notebook author may be able to save only the relevant information.

Notebooks 116a-116d are typically created by a user navigating to various web pages and clipping pieces of content from some of the web pages. As described in more detail below, the clipped content may be pasted or added into web notebooks (in various manners—both manual and automatic). Though shown as web pages 114a-114g, the documents may take the form of any appropriate network-accessible document, such as other documents authored in a markup language. Examples of such possible formats include SGML, XML, TeX, and XHTML, to name a few.

The web pages 114a-114g may contain a variety of content. For example, web page 114a may be a page for a gourmet Italian restaurant, while page 114b may be a web page maintained by a food photographer. Page 114c may be a page for an Art Deco restaurant, while web page 114e may be for an Italian restaurant. Web page 114f may be for a modern Italian restaurant, while web page 114g may be a page of a patent law firm.

Connecting lines show example correspondence between content taken from web pages 114a-114g, and web notebooks 116a-116d. For example, a user who enjoys nicely presented food may browse web sites such as restaurant web site 114a and others, and may select photographs from those web sites to show together on the users' notebook page. Likewise, a user who creates notebook 116b may be a fan of Italian cuisine, and may thus clip content from a variety of Italian restaurant web pages in an area to provide a combined page that shows the best restaurants in the area (at least according to the user). For example, page 114c might be the web site for a high-end Italian restaurant, with pictures of beautifully presented food. A user creating notebook 116b may have placed a portion (e.g., a menu and address) of the page in a notebook they have captioned "Italian Restaurants" and another user (of notebook 116a) may have placed another portion (e.g., a photo of a beautiful cannoli) on a "Food Fashion"-captioned notebook.

Each dashed box in the figure represents content from the web pages 114a-114g that has been captured by users of the system into notebooks 116a-116d. The boxes are shown in a rectangular shape consistent with many standard approaches for content selection, although content may be selected in any appropriate manner by a user. Such content may be captured in a variety of manners. For example, users may drag a mouse across content in a web page, in a well-known manner, or a computer system may default to selecting content with particular markup tags (e.g., heading tags) and select that content automatically, or semi-automatically (e.g., selecting the content, but giving the user the right to approve the clipping of the content). In particular, for example, a notebook author may be an artist looking for pictorial inspiration, and may configure a notebook application to select only images for clipping to a notebook. In such a situation, all images on a page may be selected and clipped whenever the user makes a clipping command; the user may then be given the option at that point to discard some figures, or may return to the notebook later and delete any figures they did not want clipped to the notebook.

As another example, a user may be looking only to make an outline in a web notebook, and the user may configure the notebook application such that any selection clips only the titles or headings from a group of selected content (or clips all titles and headings if no content is currently selected). After browsing a number of web sites and selecting content, the user may then view the notebook, find interesting headings or title, and use controls in the notebook application to return to the corresponding web pages to collect additional content.

In addition to clipping content based on user interactions, the system may search for custom tags that a web page author places in the page to guide clipping, e.g., "overview" tags that mark the beginning and the end of information that summarizes the content of a page. Markup language standards may define such special tags in various manners, such as vertically for specific categories of web sites, e.g., financial, travel, etc., or for other uses. Allowing such custom definition of tags may permit the system to be extensible to more uses, and thus more helpful to users of system 100 and operators of system 100.

Information in addition to the clipped material may appear in notebooks 116a-116d. For example, users may use controls in a notebook development application to add headings, sub-headings, comments, and text that they have prepared themselves to the notebook. Users may also add metadata to a notebook, such as identification of the notebook type, the user who created the notebook, users who may access the notebook, and the level of access allowed (e.g., whether the notebook is to be public, private or semi-private (for example, accessible from a few identified user accounts)).

Various forms of information may be stored in notebooks 116a-116d. For example, HTML or other markup code itself may be stored, and various clippings may simply be set in sequence in the document. Alternatively, clippings or notes may be stored individually, and may also be pointed to by placeholders in a notebook.

Metadata about particular entries in a notebook may also be stored. The metadata may include the URL from which the material was clipped, the time/date it was clipped, indicators of the amount of content in a web page before and after the content that is clipped (e.g., so that one could return to the web page later and determine where the material came from in the page even if the material itself has changed in the interim), information about a corresponding search query (e.g., search query terms, search results, a link to a particular page of results or specific result associated with a notebook or notebook entry, etc.).

Although the notebooks may be stored locally on user computers such as terminal 122, they are shown here stored in a hosted system. Storing the notebooks 116a-116d in a hosted format may provide a number of advantages. For example, hosted documents can be made available to the public more easily. Hosted documents can also be updated in real time or near real time as information in the "source" web page changes. Hosted documents can be accessed by a user from a number of networked machines—such as machines at airports, cyber cafes and the like.

In addition, a hosting system such as notebook manager 120, which may include a combination of hardware (e.g., servers) and software for performing functions described in more detail below, may in appropriate circumstances perform more functions on a hosted set of notebooks than would be permitted if the notebooks were not stored centrally. For example, the manager 120 may be configured to search the content in the notebooks 116a-116d to return search results for other users, or may analyze content in notebooks to identify indicators of popularity, or recent activity with respect to notebooks to obtain indicators of recent popularity.

A manager 120 in a hosted system may also analyze connections in notebooks to improve general search results. For example, where a third-party user conducts a search for "Italian restaurants" or a similar concept, the search ranking or score of pages 114a, 114e, and 114f may be elevated because they are referenced in a notebook captioned "Italian Restaurants." The elevation may occur under an assumption that the user who created notebook 116b was attempting to classify certain material, that the person selected an accurately descriptive heading or sub-heading, and that the page has thus been determined by a real person—who is savvy enough to form a web notebook—to be related to that term, and by extension to the search term.

In one implementation, each notebook may be stored as a separate markup document, or each note (e.g., a portion of a notebook) may be stored as a separate markup file, or other type of file. Such options may be provided as alternatives or in combinations. One or more notebook indices may point to the notes or notebooks to permit organization and navigation of the notebooks. For example, an index may include a table containing a number of URLs associated with a particular user, so that when the user is accessing the system, links to each of the notebooks may be shown. Likewise, users may search the index to find information on various other users. The index may be stored, for example, with other information relating to users and/or notebooks.

Notebook content may also be shared, if a notebook author chooses to share his or her content. The sharing may be public so that any approved user of the system may see a notebook, or it may be less public, such that access is provided only to a group of approved users (e.g., friends or friends-of-friends), such as a social network or a group of users having special access privileges to a part of a system. In addition, the access may be structured so that other users can have read-only privileges, annotating or comment privileges, or full editorial privileges. Access control, in some implementations, can be provided by associating notebooks with specific user accounts that are accessibly only through a login process.

The notebook manager 120 is an exemplary system (which may be a sub-system of a larger system) that can be used to create, manage, analyze, and deliver web notebooks. Components of the notebook manager 120 allow it to store notebooks for various users in notebook database 118, to add content submitted by users to those notebooks, to search notebooks that match queries provided by users, to transmit requested notebooks for display to users, and other appropriate functions.

The notebook manager 120 communicates with users, such as a user at terminal 122, through an interface 126. Although not shown for clarity, a variety of communications components arranged in networks, such as a LAN, WAN, or the internet, may be situated between terminal 122 and interface 126 in known manners. The interface 126 may be or include, for example, one or more web servers.

A notebook presenter 130 can format notebooks for display to users who have requested notebooks. The notebook presenter 130 may communicate with notebook database 118 to obtain notebook information where the notebook information is stored in a form other than as a complete notebook. Where notebooks are stored as multiple files or documents, the notebook presenter 130 may access the parts that make up a notebook, and may combine and format them for presentation as a complete notebook to a user. For example, a notebook outline document may contain pointers to various notebook entries, and the notebook presenter 130 may read each pointer to determine which entries to add to the notebook so as to obtain all relevant notebook entries stored in database 118. The notebook presenter 130 may then transmit the completed notebook to a user through interface 126.

Entries in a notebook or notebook outline document may also contain pointers to web pages outside of notebook database 118. Such pointers may be used, for example, when a notebook is configured to store information from web pages that change over time, such as various kinds of dynamic content. Such information could include, in one example, the current temperatures in certain areas, such as in locations shown in a notebook dedicated to travel.

The notebook presenter 130 may use information stored in user information database 132 in preparing notebooks for transmission to users. For example, user information database 132 may store verification information about users. In such implementations, when a user requests access to a notebook, the notebook presenter 130 may determine whether that user has access to the notebook, such as by checking access information stored in user information database 132.

A user information database 132 can also store other information for the proper operation of notebook manager 120. For example, database 132 can include information for organizing notebooks, such as tables representing notebooks and pointers to documents that are entries or notes in the notebooks. Also, database 132 may store metadata about notebooks and notebook entries, including the author of a notebook, the time at which an entry was added to a notebook, the source of an entry, the size of an entry, and other pertinent information for managing notebooks and notebook entries.

A search engine 128 can be used by the notebook presenter 130 to obtain information in response to queries from users. User queries can be in the form of search terms that are applied to the corpus of content in the database 118 (e.g., publicly accessible notebooks). For example, users may search for all notebooks containing content about Hawaiian vacations, and the search engine 128 may search for indicators of such content, such as the words "Hawaiian" and "vacation," related words such as "lei" and "leisure," and links to pages containing such terms. Likewise, users may search for information about patent attorneys, and may be provided in response a link to notebook 116d. If such a user selects a link, he or she may then be presented with a corresponding notebook. The content within the notebook 116d may include hyperlinks directed to web page 114g, so that if the user selects such a link, he or she may be provided with a display of the web page.

As is discussed below, the notebook manager 120 may employ or be coupled to another search engine, other than the search engine 128. For example, the notebook manager may be accessed by a more general web search engine, or search engines for other corpora. Queries submitted to the general web search engine may be routed to the notebook manager 120, and in particular, to the notebook search engine 128, to identify notebook search results that are responsive to the query. At the same time, the query may be run against other corpora, to identify a multi-category set of search results (e.g., search results that are responsive to the query and that are classified in categories such as web information, images, news, shopping, etc.).

The notebook formatter 124 may serve to receive requests from users to start new notebooks, and to add content to existing notebooks. Submission evaluator 124b within notebook formatter 124 can receive information from interface 126, and may parse and analyze the information to determine the appropriate actions to take with respect to the information. For example, if a submission is sent in the form of an HTTP request, with a command related to content selection, the submission evaluator 124b may parse the submission to determine the command and to isolate the content submitted with the command. The content may be, for example, HTML code that has been selected by a user, and that content may be extracted from the other information submitted by terminal 122. In another example, the submission may include a request to edit a notebook, such as to add a heading in a notebook, or to edit content within a notebook, such as to add comments within content that previously has been clipped from a web page.

The notebook compiler 124a can manage a user's notebooks, and can facilitate addition, editing or deletion of content in notebooks. For example, where the submission evaluator 124b has determined that a message (such as an HTTP request from the computer of a notebook author or other user) relates to content selected from a web page, it may pass the content to the notebook compiler 124a along with metadata that has been parsed from the request. Metadata may be used, for example, to determine the identity of the user, and to determine the user notebooks to which the content should be added. The notebook compiler 124a may then obtain the current version of the notebook from notebook database 118, and may append the new content to the notebook. The notebook compiler 124a may also update a database of metadata relating to the notebook (which may be stored, for example, in user information 132) and may save the updated notebook to database 118.

A notebook analyzer 134 may access notebooks in the database 118 to provide users or administrators of the system 100 with information relating to the notebooks. Notebook analyzer 134 may be programmed with various processes and other features to obtain notebook information, analyze it, and generate reports regarding the information. For example, notebook analyzer 134 may be used by the search engine 128 to build an index of content in the notebook database 118 to permit for more efficient searching of database 118. As another example, the notebook analyzer 134 may identify links between different notebooks or between notebooks and web pages, and may permit mapping of relationships in the analyzed notebooks, or web pages. As another example, the notebook analyzer 134 may determine whether particular content has been included in a notebook, such that the particular content can be highlighted. In particular, the notebook analyzer 134 may receive requests for particular web documents, or copies of such requests sent to other systems or information or content providers, and analyze the various notebooks to determine whether any portions of the particular web documents have been included in any notebooks. The requests may identify the web documents as a whole (e.g., by a precise URL), the requests may include a portion of the web documents' underlying content, or the requests may identify the web documents in some other manner (e.g., by an identifier, such as an identifier that identifies the document in an indexed systems). For those web documents having portions that are included in one or more notebooks, the notebook analyzer 134 can identify those portions to another system component that causes the portions to be highlighted.

Through these components, notebook manager 120 can enable users to create new notebooks, edit existing notebooks, combine information from various notebooks; allow users to see notebooks created by other users; allow users to search across multiple notebooks; permit a system to analyze notebooks such as to provide searching of notebooks, more efficient searching of web content, and easier navigation of notebooks; and facilitate generation of reports regarding notebooks and notebook data. In certain implementations, fewer than all such functions may be performed by the notebook manager 120.

Figure 2:
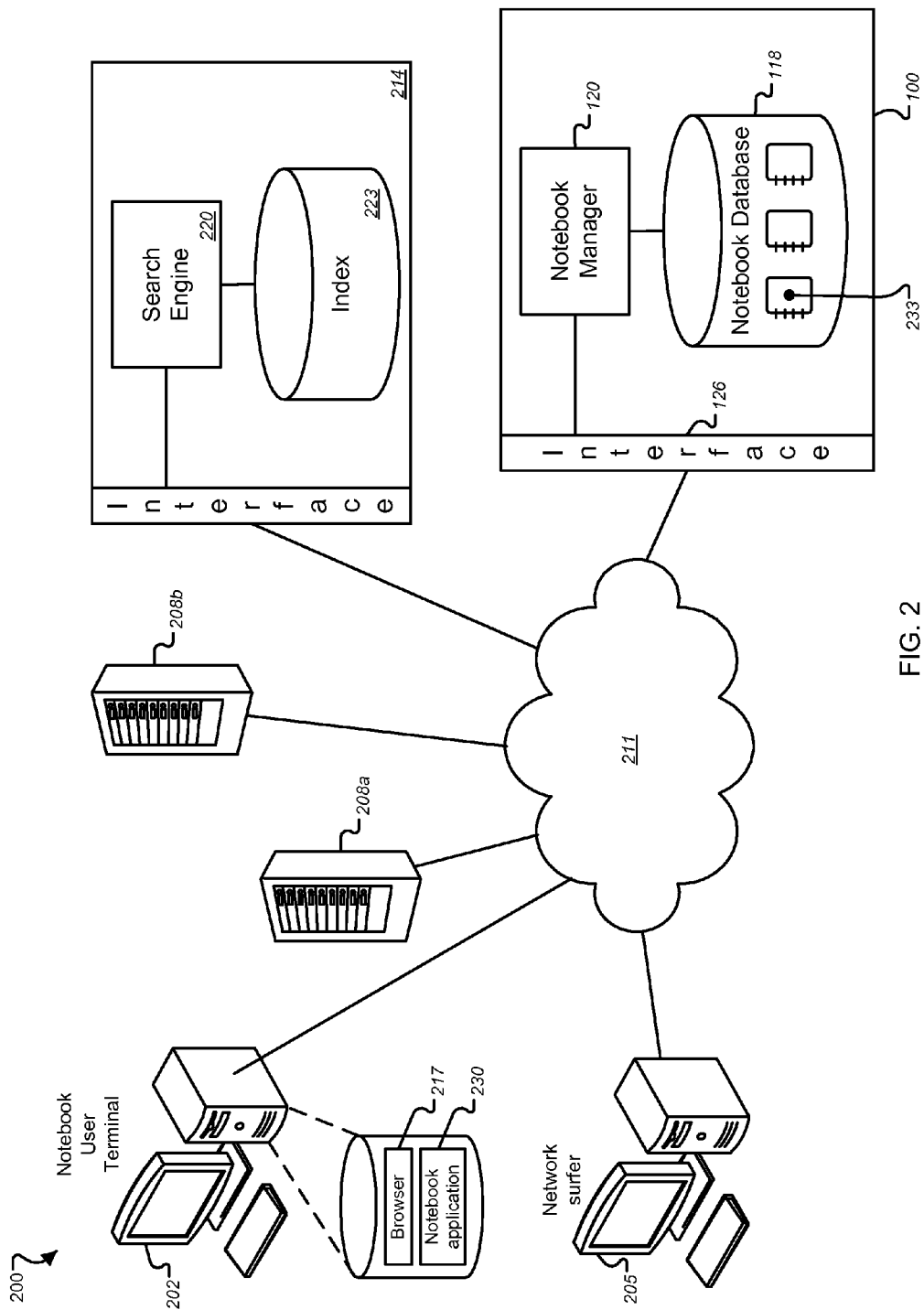
FIG. 2 is a block diagram of an example environment 200 in which the web notebook system of FIG. 1 can be employed to highlight web content.

FIG. 2 is a block diagram of an example environment 200 in which a web notebook system 100, such as that shown in FIG. 1, can be employed to highlight web content that has been included in one or more web notebooks. As shown in one implementation, the environment 200 includes user devices, such as devices 202 and 205; content providers, including example content providers 208a and 208b; and a network 211 that couples the user devices 202 and 205 to the content providers 208a and 208b.

For purposes of example, the user devices 202 and 205 are depicted as wired desktop machines, but the reader will appreciate that any user device that can access network-accessible information can be employed, including, for example, laptop computing devices, handheld computing devices, mobile communication and information management devices, etc.

The network 211 is depicted, by way of example, as a single entity, but the reader will appreciate that the network 211 can represent any suitable network that can couple devices to each other, including, for example, the internet, a network corresponding to an internet service provider, other public or private networks, wireless communication networks, the public switched telephone network, etc. Content providers 208a and 208b are representative of various types of entities that provide network-accessible information, such as corporations, news organizations, media organizations, etc.

A user of the device 202 may employ a browser 217 running on the device to directly access, via the network 211, information provided by a content provider (e.g., content providers 208a or 208b). Alternatively, the user may employ the browser 217 to access an information provider 214 to locate and retrieve network-accessible content of interest.

In some implementations, the information provider 214 includes a search engine 220, which may employ an index 223 to index content that is available via the network 211, such as information available from the content providers 208a and 208b. Other components of the information provider (not shown) may continuously or nearly continuously crawl or scan devices that are coupled to the network 211 in order to index new information as it is added. In some implementations, the information provider 214 receives search queries from various user devices, such as the devices 202 and 205, and provides content that is responsive to the search queries, or links to such content (e.g., based on information stored in the index).

The index 223 is shown as a single index, but in some implementations, the index is subdivided into different corpora, each of which can relate to a different type of information, such as general web information, images, maps or other location-based information, shopping information, notebook information, etc. To index notebook information, the information provider 214 may access a separate notebook system 100. Alternatively, the information provider 214 and the notebook system 100 may be integrated into a single system.

Access to the notebook system 100 is, in some implementations, controlled. For example, only users who have user accounts in the system may be able to access the system 100. As another example, all users may have access to some portions of the system, while other portions of the system may be accessible only to certain users or classes of users. More specifically, some notebooks within the system may be publicly accessible, while other notebooks may be accessible only to the users who created them or to a smaller group of users designated by the users who created the access-restricted notebooks.

An example scenario in which the flow of information between components of the system 200 is now described. A user can employ the device 202 to access the information provider 214. Specifically, the user can employ the browser 217 to access, via the network 211, the information provider 214, which may include an internet search engine 220. More particularly, the user can submit a query to the information provider 214, such as "top vacation destinations," and in response the information provider 214 can provide responsive search results. The responsive search results can include, for example, links to content provide by the content providers 208a and 208b. Upon selection of a link in the search results, the browser can retrieve actual underlying content from the appropriate content provider.

The user can save some of the content in a web notebook. For example, if the user has a user account in the notebook system 100, and the user has performed any login procedures that may be necessary to access the notebook system 100 and a local notebook application 230, selection of the content and activation of appropriate controls (as described above with reference to FIG. 1) can cause the selected content to be added to a notebook corresponding to the user's account (e.g., notebook 233). That is, the selected content may be stored in the notebook 233, or a link to the content may be stored in the notebook 233.

The above example is provided in the context of separate information provider 214 and notebook systems 100, but as previously indicated, these systems could be integrated. That is, in some implementations, the notebook manager 120 and notebook database 118 can be included in an information provider system, such as the information provider 214. Moreover, common login or access-control techniques could be employed to provide users access to web notebooks and to particular features of the information provider.

In some implementations, a user may benefit from knowing that some content has been previously stored in a notebook—either a notebook that is maintained by or for that user, or a notebook of another user. For example, referring to the above example in which a user of the device 202 submits a query for "top vacation destinations" to the information provider 214, it may be advantageous to the user to be able to quickly determine which search results that are provided in response to the query have content that the user has previously clipped and stored in a notebook. The ability to make such a determination may help the user locate previously viewed content that the user determined was relevant or interesting.

As another example, other users, such as a network surfer employing device 205, may also benefit from being able to identify content that others have previously clipped and stored in a notebook, since the fact that such content was stored may provide an indirect indication of the content's usefulness or relevance. More particularly, when the network surfer using device 205 submits a similar query to the information provider, such as "good vacation ideas," the network surfer may more quickly locate helpful information by seeing visually demarcated (e.g., highlighted) content that relates to his or her query, which other users (e.g., the user of the device 202) have stored in their notebooks. That is, vacation information that other user(s) have stored in a notebook may be more likely to be relevant to the network surfer's query than other information that has not been stored in a notebook. Accordingly, highlighting or otherwise visually demarcating information that other users have stored in a notebook (e.g., providing some sort of visual indicator with the information) can be advantageous to subsequent users who view the information.

In some implementations, a visual indicator can include highlighting of certain portions of the web content (e.g., a semi-transparent colored layer placed on top of the content). In some implementations, the visual indicator can include graphical objects next to web page content that has been added to another user's web notebook. In some implementations, the transparent colored layer or the adjacent graphical objects can additionally include information about a web notebook into which the information was previously clipped, such as a hyperlink to the web notebook, and other identifiable web notebook information, such as the web notebook name. Other examples of highlighting are provided in and described with reference to FIGS. 3A and 3B.

Figure 3A:
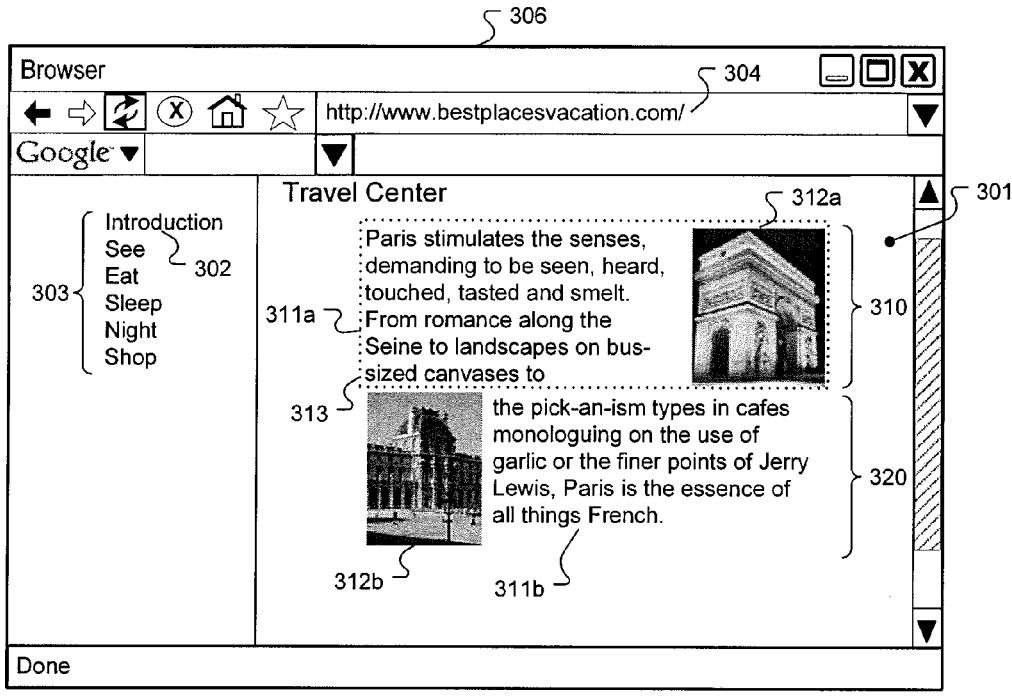
FIGS. 3A-3B are screen shots showing example web pages that can include highlighted web page content.
Figure 3B:
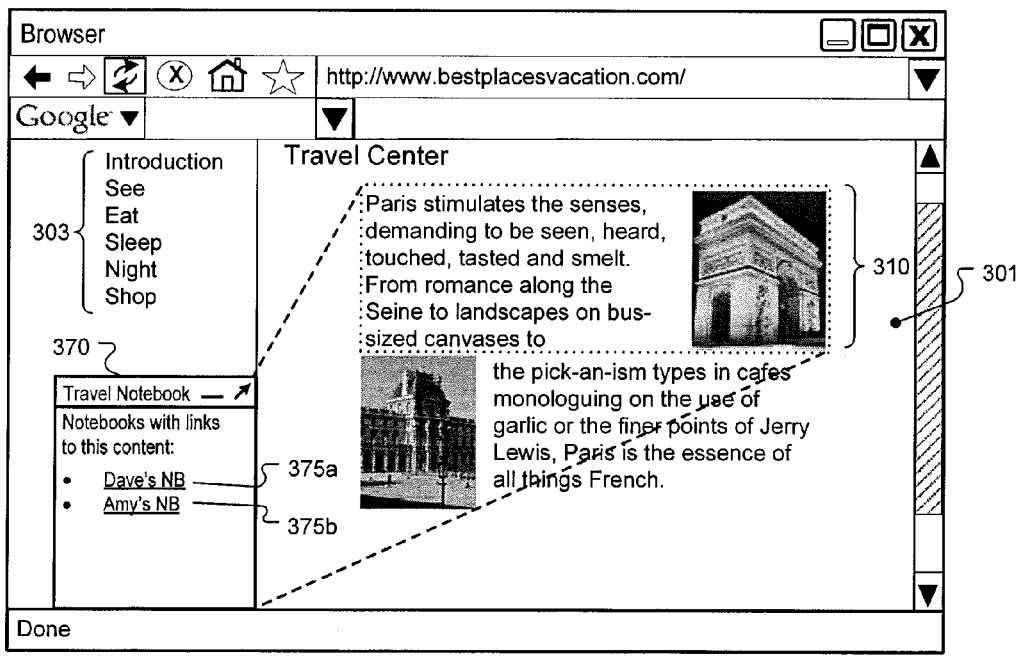

FIGS. 3A-3B are screen shots showing example web pages that can include highlighted web page content. In the example of FIG. 3A, a browser 306 displays a page 301 related to Paris, France. In this example, the page 301 includes information in the form of text 311a and 311b, and pictures 312a and 312b related to Paris, France. Given the popularity of travel to Paris, and the increased use of the internet for travel planning, another internet user planning a trip to Paris may have previously visited the web page 301 and clipped content 310, including the text 311a and the picture 312a, and saved the clipped content in a web notebook. Accordingly, this content 310 can be highlighted by a notebook system as shown—in this case by being circumscribed by a dotted line 313.

In other implementations, portions of the page 301 that have been previously clipped and saved in a web notebook can be highlighted in other ways. For example, the highlighting can include a shaded or hatched background in only the portion of the web page that has been previously clipped by a web notebook user. As another example, the highlighting can include a vertical bar that sets off content that is stored in a notebook, as is illustrated and described in more detail with reference to FIGS. 4A and 4B.

In some implementations, as depicted in FIG. 3B, hyperlinks to web notebooks that include highlighted content can also be included in the web page 301. For example, a pop-up window 370, or other selection control, can appear when a user of the page 301 selects the highlighted content 310 (e.g., by selecting or hovering over the highlighted area with a pointing device). As another example, the window 370 may appear by default, without any user input relative to the highlighted content 310. In any case, in one implementation as shown, the window 370 can include a list of hyperlinks (e.g., hyperlinks 375a, 375b) to individual web notebooks maintained by previous visitors of the currently displayed web page (e.g., web page 301), who have clipped and saved the highlighted content 310 on web page 301.

In some implementations, only web notebooks that are configured to be publicly accessible may be displayed. User selection of hyperlink 375a or 375b may redirect the user to the corresponding web notebook. In this manner, the user may benefit from other content identified by another user. In particular, for example, a user looking for travel ideas for Paris can select the link 375a to "Dave's NB," and accordingly be redirected to another user's web notebook (e.g., "Dave's NB"), which may include the other user's compilation of additional travel information—possibly relating to Paris. In this example, the user may determine that other user(s) have found the information on page 301 to be relevant (e.g., from the fact that the content 310 is highlighted), and the user, through features of the notebook system, may be further directed to other relevant information that another user has already compiled (e.g., in the form of that user's publicly accessible notebook).

In the above example, publicly accessible notebooks of other users (users other than the one who originally browsed to page 301) are described as being linked to highlighted content 310. In some implementations, a user's own web notebooks can also—or additionally—be linked. That is, the user who browsed to page 301 in the examples of FIGS. 3A and 3B may maintain a web notebook that already stores the content 310. Accordingly, the user may be provided with a link to his or her own notebook(s) (e.g., in the window 370) into which the content 310 has been saved.

In some implementations, content from only a user's own notebooks may cause corresponding web content to highlighted. In other implementations, only other users' saved content causes web content to be highlighted. In still other implementations, web content is highlighted when it is saved in either the user's own web notebook(s) or in other users' notebooks.

In some implementations, highlighting can reflect an aggregate experience of many users. For example, the content 310 may only be highlighted if more than a threshold number of number of users have saved the content 310 to their own web notebooks. The threshold number may be set at a number that is sufficient to evince truly "popular" content, and that number may depend on the subject or category of information. For example, in the context of travel to Paris, content 310 may only be highlighted if 100 or more users have clipped the content and saved it to their own web notebooks. The threshold number could be 1,000 or 5,000, as other examples. As another example, esoteric content that may be relevant to only a small number of specialists in a particular field may be highlighted if 2 or 5 or 10 users have clipped and saved it in a web notebook.

Threshold numbers can be applied to assess a number of users who have clipped and saved content, even if the notebooks into which the content has been clipped are not configured to be publicly accessible. That is, private notebooks may be analyzed for purposes of controlling highlighting based on a threshold number of distinct notebooks in which the content appears, but only publicly accessible notebooks may be linked to the highlighted content (e.g., as depicted with the links 375a and 375b). Moreover, even if a large number of notebooks that include the highlighted content 310 are publicly accessible, only certain publicly accessible notebooks may be displayed. Thus, in the example of FIG. 3B, "Dave's NB" and "Amy's NB" may represent two of many publicly accessible notebooks that store the content 310. Selection of the notebooks whose links are provided can be made in various ways, such as, for example, based on size of the corresponding web notebook, age of the notebook, internal structure of links included in the notebook, determined overall relevance of the corresponding notebook to a search query that may have resulted in the user viewing the page 301, etc.

To get to the content page 301, a user may have previously submitted a search query to an information provider (e.g., the information provider 214 shown in FIG. 2), and the information provider may have provided a highlighted version of the page 301 (e.g., in conjunction with the notebook system 100). Alternatively, the user may have directly navigated to the page 301, and a notebook application running on the user's machine (e.g., application 230 shown in FIG. 2) may have communicated with the notebook system 100 in the background in order to determine what, if any, content on the page 301 should be highlighted.

Figure 4A:
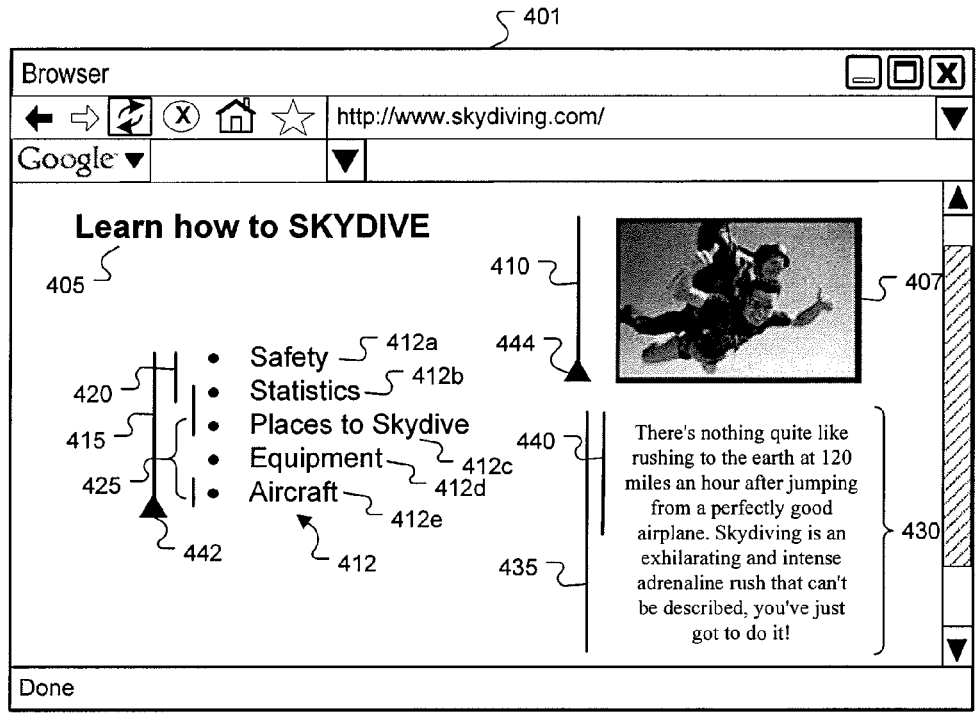
FIGS. 4A-4B are screen shots showing additional example web pages that can include highlighted web page content.
Figure 4B:
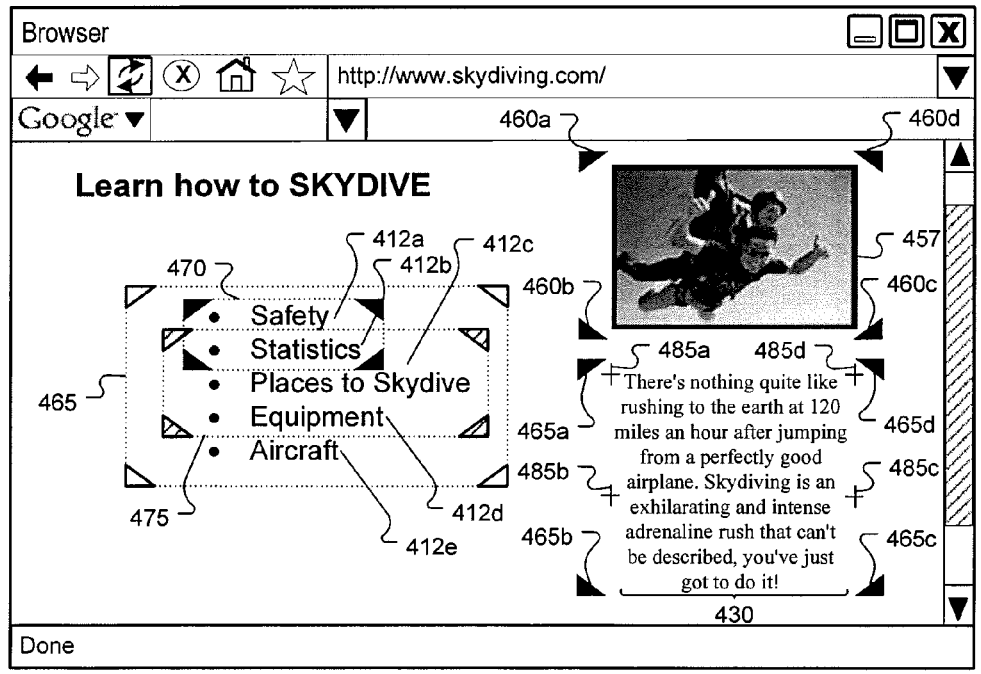

FIGS. 4A-4B are screen shots showing additional example web pages that can include highlighted web page content using graphical indicators, and notebook links that may include this content. FIGS. 4A-4B include graphical indicators that can alert users of notebooked web page content that are different that the graphical indicators as described with reference to FIGS. 3A-3B. Despite the differences, the premise of the indicators can be the same: to visually alert, or otherwise call attention to a user that a previous visitor to a web page has highlighted portions of the content of the web page, and added it to their web notebook.

Referring to the implementation of FIG. 4A, the web page 401 can include page title 405, hyperlinks 412, text content 430, and a picture 407. As an alternative to the highlighting of the notebooked web page content, as was described with reference to FIG. 3A-3B, web page 401 can alert visitors to web page content that has been added to other users' notebooks by using vertical lines or bars that can extend from the top of the selected web page content to the bottom. Vertical bar indicator 420 can indicate clipped web page content by a previous user that includes the hyperlinks for safety 412a and statistics 412b. Vertical bar indicator 425 can indicate web page content that has been clipped by a previous user that includes the hyperlinks for statistics 412b, places to skydive 412c and aircraft 412e. A vertical bar indicator (e.g., vertical bar indicator 425) can be discontinuous such that multiple content items may be highlighted without necessarily selecting all items that exist as part of a group. Vertical bar indicator 410 can alert a user that a previous visitor has added picture 407 to their web notebook. Text content 430 can be highlighted as notebooked by a previous visitor to the web page using vertical bar indicator 435, which includes text content 430. Vertical bar indicator 440 can highlight a portion of the text content 430 (e.g., the first sentence) that has been previously notebooked.

Vertical bar indicators for highlighting notebooked content can be represented in a variety of forms. In some implementations, a notebook user may notebook more than one web page content area of interest to be included is their notebook. In such implementations, multiple vertical bar indicators on a web page can indicate web page content notebooked by a single user. The indicators can be presented to the user in a common format, for example, using the same color, line style or pattern. For example, a previous visitor may bookmark the picture 407, and the hyperlinks 412. In this example, vertical bar indicators 410 and 415 can be presented to the current web page user in a similar manner, such as with a common color, while portions notebooked by a different user may be differently colored. In some implementations, a portion of a vertical bar indictor can include a 'tag' or some other graphical symbol that can indicate to a user that the web page content highlighted by the indicators is included in the same web notebook. For example, vertical bar indicators 415 and 410 can include triangular shaped tags 442 and 444 respectively.

Given that large numbers of users may visit a web page and add web page content to their web notebooks, a user can have the option to limit the number of graphical indicators of previously notebooked web page content. This can allow for a less cluttered view of a web page from which many users have previously clipped content. For example, a user can select preferences for viewing of notebooked web page content indicators. In some implementations, a user may select a maximum of three graphical indicators to be presented on a web page at any given time. In another implementation, a user may select date ranges corresponding to when the web page content was notebooked by a previous user. In another implementation, a user may be part of a network of notebook users, and can choose to only show graphical indicators representing notebooked web page content from other users in their notebook network.

Referring to the implementation of FIG. 4B, the graphical indicators for alerting users of notebooked web page content can include graphics that frame the notebooked content. The indicators can include the use of graphical icons that can represent corners of a frame that can enclose the notebooked web page content. For example, frame corners 460a-d can be used to highlight picture 457. In some implementations, the corners of a frame can be connected by lines to aid the user in distinguishing multiple, nested, or overlapped frames. For example, frame 465 can highlight hyperlinks 412a-e frame 475 can highlight hyperlinks 412b-d, and frame 470 can highlight hyperlinks 412a-b.

As was described with reference to FIG. 4A, notebooked web page content by a single user can be highlighted using indicators that can be presented to the user in a common format, for example, using the same color, line style, or pattern. In some implementations, frame corners can be represented using the same icons for one user. For example, in FIG. 4B, frame corners 460a-d are the same graphical icon as the frame corners for frame 470, which can indicate that the same notebook user notebooked these two areas of web page content. In another implementation, where lines are used to connect the frame corners, the frame corners may use the same graphical icons but the line style can be the same for notebooked web page content for a particular user. In some implementations, to improve visual clarity and reduce ambiguity, graphical markers for notebooked web page content that are nested or overlapped can be of a different size or shape. For example, text 430 can include web page content that two different previous web page visitors notebooked.

To further illustrate, one previous visitor may have added notebooked text 480 to their web notebook, which is visually highlighted by frame corners 485a-d. Another previous visitor may have added only a portion of the text 480 to their web notebook. To reduce the number of frame corner graphics, the highlighted portion of the text notebooked by the second visitor to the web page may be encapsulated by hatch marks 490a-d. The relative size, color, shape, or other distinguishing features of highlighted content that can be included within a larger highlighted area may be selected such that the graphical indicators coalesce into a cohesive web page that maintains aesthetic properties.

Figure 5:
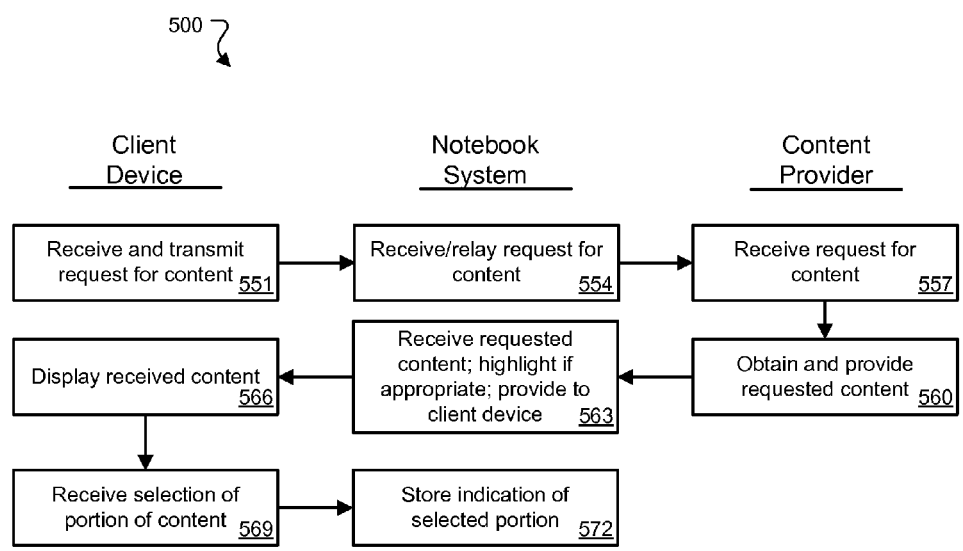
FIG. 5 is a flow diagram illustrating an example flow process for highlighting web page content.

FIG. 5 is a flow diagram illustrating an example flow process 500 for highlighting web page content. For purposes of explanation, the example actions in the process 500 are depicted as occurring at a client (e.g., user device 202), a notebook system (e.g., notebook system 100), and a content provider (e.g., content provider 208b), but the reader will appreciate that the actions or similar actions could also be carried out by fewer devices or sites or with a different arrangement of devices or sites.

In some implementations, the example process 500 begins with a client device (e.g., client device 214) receiving (551) a request for content (e.g., a request for a particular document, such as a URL) and the client device transmitting the request to a content provider (e.g., content provider 208b). As shown in one implementation, the request is transmitted (551) via the notebook system 100. In particular, the notebook system 100 can receive and relay (554) the request to the content provider, which receives (557) the request. In this implementation, the notebook system 100 can act as a proxy for the content provider. In other implementations, the request can be transmitted (551) directly to the content provider, but a copy of the request can be transmitted (554) to the notebook system, or the request can be otherwise provided to the notebook system.

Upon receiving (557) the request, the content provider can obtain (560) the requested content and provide it to the notebook system 100. The notebook system 100 can receive (563) the requested content, highlight (563) any of the content that should be highlighted, and provide (563) (possibly highlighted) content for display (506) by the client. That is, the notebook system 100 can identify content that is included in another web notebook—such as the user's own web notebook, another web user's notebook, or a threshold number of other user's notebooks, depending on the configuration, and highlight or otherwise visually demarcate that content, as described with reference to the previous figures.

After viewing the content, a user of the client device may wish to clip some of the displayed content into his or her own notebook. Accordingly, the user can select the content (e.g., in the manner described above with reference to FIG. 1), and an indication of the selection can be stored (572) in the notebook system 100. More particularly, a user of the client device 202 can employ a browser 217 and notebook application 230 (which can, for example, be integrated in the browser 230 or run in the background) to select web content (regardless of whether that content is itself highlighted) and store the indication of the selection and/or the underlying selected content itself in a notebook associated with an account of the user, such as the notebook 223. The stored indication can then cause content to be highlighted, or additionally highlighted, when viewed by other users, such as in the manner depicted in FIG. 3A, 3B, 4A or 4B.

Figure 6:
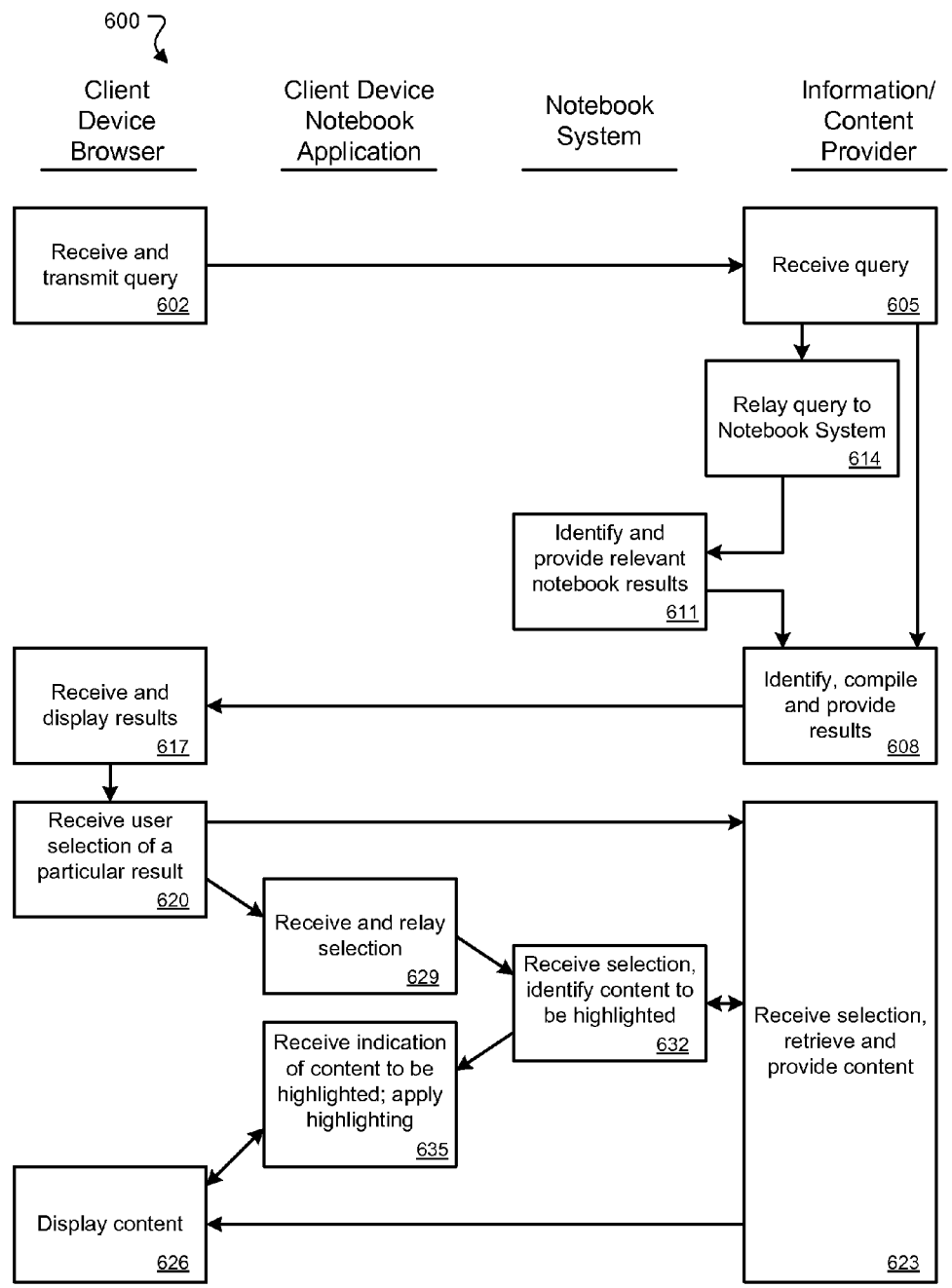
FIG. 6 is a flow diagram illustrating another example process by which highlighted content can be provided to a user.

FIG. 6 is a flow diagram illustrating another example process 600 by which highlighted content can be provided to a user. For purposes of explanation, the example actions in the process 600 are depicted as occurring at a client (e.g., user device 202), specifically within a browser (e.g., a browser 230) running on the client device; and at an information and/or content provider (e.g., the information provider 214 and/or content providers 208a and 208b). Additionally, portions of the process can occur in a notebook application (e.g., the notebook application 230) and in a notebook system (e.g., the notebook system 100). In some implementations, the actions that occur in the notebook application and notebook system can occur separately from actions that occur in the client device and the information/content provider, and from the perspective of the user, these actions may run in the background. The reader will appreciate that the actions depicted in FIG. 6, or similar actions, could also be carried out by fewer devices, applications or sites, or with a different arrangement of devices, applications or sites.

As shown in one example, the process 600 can include receiving (602) a query (e.g., from the browser 230 running on the client device 214). For example, a user of the client device 202 can employ the browser to submit a query to an information provider that includes a search engine. The information provider (e.g., the information provider 214) receives (605) the query and identifies (608) corresponding results that are responsive to the query. In some implementations, identifying (608) results that are responsive to the query includes identifying (611) notebook results that are relevant (e.g., notebooks having publicly accessible content that is relevant to the query). In order to identify such notebook results, the information provider may relay (614) the query to a separate notebook system or index. Alternatively, a notebook index that is integrated into the information provider may be searched, along with other indices (e.g., indices associated with various content corpora). In still other implementations (not shown), the client device may send the query to both the information provider and the notebook system. However the responsive search results are identified, they can be compiled and provided (608) to the client device.

The client device can receive (617) the search results, display them, and subsequently receive (620) user selection of a particular result. The client device, and particularly a browser application running on the client device (e.g., browser application 217, running on the client device 202) can transmit the selection to the information provider (or to a separate content provider, if applicable), which can, in turn, retrieve and provide responsive content. In some implementations, the content corresponding to a selected search result is provided in the form of markup code (e.g., HTML) for rendering and display by the client device (626).

In some implementations, while content corresponding to the selected search result is being retrieved (623), the selection of the search result can also be received by the notebook application (e.g., notebook application 230) and relayed to the notebook system (e.g., notebook system 100). In some implementations, this process occurs in the background, without explicit involvement from the user. (Although the user may have previously provided login or other authentication information (e.g., a cookie or user identifier) by which the user can gain access, in the background, to either or both of the notebook application 230 or the notebook system 100.)

The notebook system can receive (632) the selection and can determine whether any content corresponding to the selected search result should be highlighted. That is, the notebook system 100 can determine whether any web notebooks stored within its database include content that corresponds to the selected search result. In some implementations, the selection of the search result carries with it enough information for the notebook system to make this determination. For example, the selection could include an identifier (e.g., a precise URL) that the notebook system 100 can use to index its notebooks. In other implementations, the notebook system 100 may separately interact with the information or content provider to identify whether specific content corresponding to the selected search result has been previously notebooked.

Even if content corresponding to selected search result has been notebooked, a separate determination may be made as to whether or not that content should be highlighted in the client device. For example, filtering may be applied (e.g., by the notebook application 230 and/or the notebook system 100) such that only content that the same user of the client device has previously notebooked, regardless of whether other users have notebooked the same content. As another example, filtering may be applied such that content is identified (632) as content to be highlighted only if that content appears in a threshold number of notebooks (e.g., a threshold number that could be determined by the content itself), as described above.

When the notebook system identifies content corresponding to the selected search result, which is to be highlighted, the notebook system can send an indication to the notebook application. Such indication can include, for example, an identifier of the portion of the content to highlight. The indication can further include specific formatting to apply to highlight the content. For example, with reference to FIG. 4A, some portions of the content may have a first type of highlighting (e.g., a vertical bar 415 with an additional indicator 442, as shown in FIG. 4A) while other portions of the content have a second type of highlighting (e.g., a vertical bar 435 without the extra indicator).

In some implementations, the indication of which content is to be highlighted (and how that content should be highlighted) is provided as markup code. For example, the notebook system 100 can, in some implementations, provide the notebook application 230 with an XML message identifying specific content to highlight. In such implementations, the notebook application 230 can interact with the browser 217 to apply the highlighting. In particular, for example, the notebook application can retrieve a copy of the underlying content (e.g., in markup form) as it was provided (623) by the information or content provider, modify the content (e.g., by modifying the underlying markup content in line with, for example, an XML message from the notebook system), and cause the browser to be refreshed with the modified markup content. In this example, the browser may initially and briefly display content that is not highlighted, and that content may be subsequently highlighted (e.g., a short, possibly imperceptibly short period of time later, following latencies with the possibly separate communications between the notebook application 230 and the notebook system 100) by being replaced with modified content to which appropriate highlighting has been applied. As another example, the notebook system 100 may modify markup code associated with the content (e.g., HTML, XML, xHTML, WML, etc.) in order to apply the highlighting, and provide (632) the modified markup code to the notebook application, which can provide (635) it to the browser.

A number of examples have been provided of how highlighting can be applied to web content, based on whether portions of that content appear in one or more web notebooks. The reader will appreciate that other variations are possible and contemplated, beyond those explicitly described. For example, actions in the example processes 500 and 600 can be omitted, added, reordered or performed by different devices, applications, or systems. Markup code is provided as an example, but other network accessible files may be modified in a manner that highlights particular content. Visual highlighting has primarily been described, but other kinds of highlighting are also contemplated. For example, audio content may be "highlighted" by being modified to have additional audio content that demarcates particular portions (e.g., to indicate that those portions have been added to a web notebook). Moreover, electronic documents have been described as "web" notebooks, but the reader will appreciate that highlighting can be applied to any network-accessible documents or files, whether or not those documents are files are stored on or accessible from a system that is formally considered web-based or web-connected.

Figure 7:
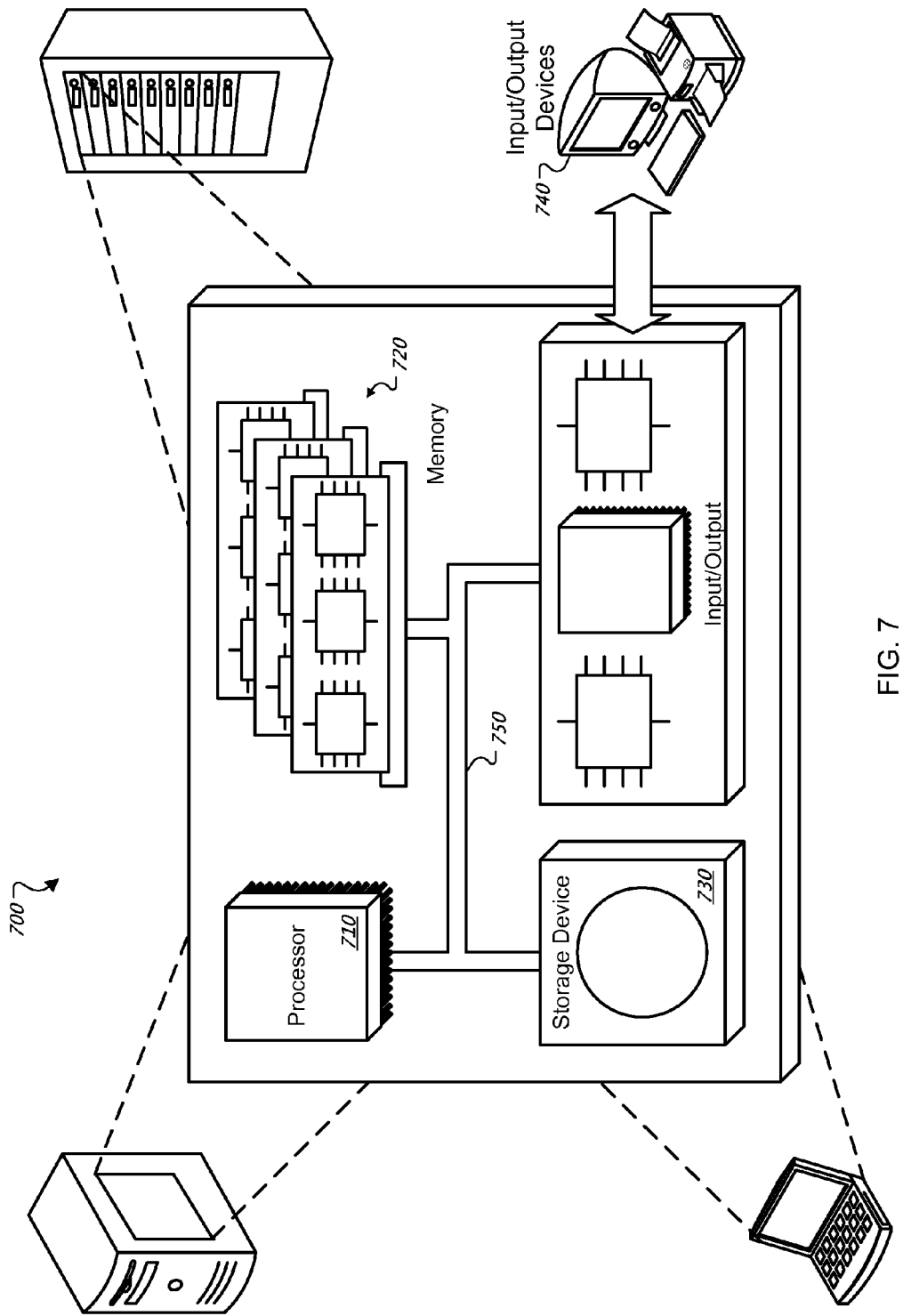
FIG. 7 is a block diagram of a computing device that may be used to implement the systems, methods and tools described in this document.

FIG. 7 is a block diagram of a computing device 700 that may be used to implement the systems, methods and tools described in this document, as either a client or as a server(s), or a combination of the two. The computing device 700 is intended to represent various forms of digital devices, such as laptops, desktops, workstations, personal digital assistants, servers, blade servers, mainframes, or other appropriate computers or devices.

The computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown. For example, the computing device 700 may be implemented as a standard server 720, or multiple times in a group of such servers. The computing device 700 may also be implemented as part of a rack server system 724. In addition, the computing device 700 may be implemented in a personal computer such as a laptop computer 722. Each of such devices may contain one or more of computing device 700 and an entire system may be made up of multiple computing devices 700 communicating with each other.

A number of implementations have been described. Nevertheless, it will be understood that various modifications may be made without departing from the spirit and scope of the disclosed implementations. For example, various forms of the flows shown above may be used, with steps re-ordered, added, or removed. Accordingly, other implementations are within the scope of the following claims.

What is claimed is:

1. A computer-implemented method comprising:
   receiving, in a system that maintains web notebooks for a plurality of user accounts, a request for a web document from a client computing device that is associated with a particular user account of the plurality of user accounts;
   determining a number of web notebooks that each include a portion of the web document, the number of web notebooks being associated with the plurality of user accounts;
   determining a threshold number, the threshold number being greater than one, wherein determining the threshold number comprises:
      determining a subject matter of the requested web document, wherein the subject matter is based on at least one of a subject and a category of information provided in the requested web document;
      determining a popularity of the subject matter, wherein the determining comprises analyzing the web notebooks to identify instances of content associated with the subject matter having been added to one or more of the web notebooks; and
      setting the threshold number, wherein the threshold number is proportional to the determined popularity of the subject matter; and
   determining that the number of web notebooks meets or exceeds the threshold number, and in response:
      providing for display by the client computing device a highlighted version of the web document, wherein the highlighted version comprises the web document and a visual indicator that highlights the portion, and
      providing access to one or more of the number of web notebooks in association with the highlighted version of the web document.

2. The computer-implemented method of claim 1, wherein the number of web notebooks is determined based on public web notebooks and private web notebooks.

3. The computer-implemented method of claim 2, wherein the one or more of the number of web notebooks comprise public web notebooks.

4. The computer-implemented method of claim 1, wherein the number of web notebooks is determined based on web notebooks of user accounts other than the particular user account.

5. The computer-implemented method of claim 1, further comprising receiving a search query from the client computing device and providing a plurality of search results that are responsive to the search query for display by the client device, wherein receiving the request comprises receiving selection input from the client device identifying one of the plurality of search results.

6. The computer-implemented method of claim 1, wherein the visual indicator comprises a semi-transparent background that is distinct from parts of the web document other than the highlighted portion.

7. The computer-implemented method of claim 1, wherein the visual indicator comprises a graphic that is displayed next to the portion.

8. The computer-implemented method of claim 1, wherein determining the popularity of the subject matter comprises identifying recent activity with respect to one or more of the web notebooks.

9. A system comprising:
one or more computers configured to perform operations comprising:
receiving, in a system that maintains web notebooks for a plurality of user accounts, a request for a web document from a client computing device that is associated with a particular user account of the plurality of user accounts;
determining a number of web notebooks that each include a portion of the web document, the number of web notebooks being associated with the plurality of user accounts;
determining a threshold number, the threshold number being greater than one, wherein determining the threshold number comprises:
determining a subject matter of the requested web document, wherein the subject matter is based on at least one of a subject and a category of information provided in the requested web document;
determining a popularity of the subject matter, wherein the determining comprises analyzing the web notebooks to identify instances of content associated with the subject matter having been added to one or more of the web notebooks; and
setting the threshold number, wherein the threshold number is proportional to the determined popularity of the subject matter; and
determining that the number of web notebooks meets or exceeds the threshold number, and in response:
providing for display by the client computing device a highlighted version of the web document, wherein the highlighted version comprises the web document and a visual indicator that highlights the portion, and
providing access to one or more of the number of web notebooks in association with the highlighted version of the web document.

10. The system of claim 9, wherein the number of web notebooks is determined based on public web notebooks and private web notebooks.

11. The system of claim 10, wherein the one or more of the number of web notebooks comprise public web notebooks.

12. The system of claim 9, wherein the number of web notebooks is determined based on web notebooks of user accounts other than the particular user account.

13. The system of claim 9, further comprising receiving a search query from the client computing device and providing a plurality of search results that are responsive to the search query for display by the client device, wherein receiving the request comprises receiving selection input from the client device identifying one of the plurality of search results.

14. The system of claim 9, wherein the visual indicator comprises a semi-transparent background that is distinct from parts of the web document other than the highlighted portion.

15. The system of claim 9, wherein the visual indicator comprises a graphic that is displayed next to the portion.

16. The system of claim 9, wherein determining the popularity of the subject matter comprises identifying recent activity with respect to one or more of the web notebooks.

17. A non-transitory computer readable medium storing instructions that, when executed by one or more processors, cause the one or more processors to perform operations comprising:
receiving, in a system that maintains web notebooks for a plurality of user accounts, a request for a web document from a client computing device that is associated with a particular user account of the plurality of user accounts;
determining a number of web notebooks that each include a portion of the web document, the number of web notebooks being associated with the plurality of user accounts;
determining a threshold number, the threshold number being greater than one, wherein determining the threshold number comprises:
determining a subject matter of the requested web document, wherein the subject matter is based on at least one of a subject and a category of information provided in the requested web document;
determining a popularity of the subject matter, wherein the determining comprises analyzing the web notebooks to identify instances of content associated with the subject matter having been added to one or more of the web notebooks; and
setting the threshold number, wherein the threshold number is proportional to the determined popularity of the subject matter; and
determining that the number of web notebooks meets or exceeds the threshold number, and in response:
providing for display by the client computing device a highlighted version of the web document, wherein the highlighted version comprises the web document and a visual indicator that highlights the portion, and
providing access to one or more of the number of web notebooks in association with the highlighted version of the web document.

18. The non-transitory computer readable medium of claim 17, wherein the number of web notebooks is determined based on public web notebooks and private web notebooks.

19. The non-transitory computer readable medium of claim 18, wherein the one or more of the number of web notebooks comprise public web notebooks.

20. The non-transitory computer readable medium of claim 17, wherein the number of web notebooks is determined based on web notebooks of user accounts other than the particular user account.

21. The non-transitory computer readable medium of claim 17, further comprising receiving a search query from the client computing device and providing a plurality of search results that are responsive to the search query for display by the client device, wherein receiving the request comprises receiving selection input from the client device identifying one of the plurality of search results.

22. The non-transitory computer readable medium of claim 17, wherein the visual indicator comprises a semi-transparent background that is distinct from parts of the web document other than the highlighted portion.

23. The non-transitory computer readable medium of claim 17, wherein the visual indicator comprises a graphic that is displayed next to the portion.

24. The non-transitory computer readable medium of claim 17, wherein determining the popularity of the subject matter comprises identifying recent activity with respect to one or more of the web notebooks.

* * * * *

UNITED STATES PATENT AND TRADEMARK OFFICE
CERTIFICATE OF CORRECTION

PATENT NO.         : 8,799,273 B1                                    Page 1 of 1
APPLICATION NO.    : 12/334005
DATED              : August 5, 2014
INVENTOR(S)        : Bay-Wei Chang et al.

It is certified that error appears in the above-identified patent and that said Letters Patent is hereby corrected as shown below:

On the Title Page, Item (56)

In Other Publications:

Page 2, column 1, line 32, delete "/articile/5872>" and insert -- /article/5872> --, therefor.

Page 2, column 2, line 5, delete "hitp://" and insert -- http:// --, therefor.

Page 2, column 2, line 12, delete "mozilia.com" and insert -- mozilla.com --, therefor.

Page 2, column 2, line 44, delete "macropoo." and insert -- macropool. --, therefor.

Page 2, column 2, line 45, delete "saver/irldex." and insert -- saver/index. --, therefor.

Page 2, column 2, line 55, delete "supportmicrosoft.com" and insert -- support.microsoft.com --, therefor.

Page 2, column 2, line 73, delete "htrp://" and insert -- http:// --, therefor.

Page 2, column 2, line 73, delete "/heip.plum" and insert -- /help.plum --, therefor.

Page 3, column 1, line 22, delete "/researeh/" and insert -- /research/ --, therefor.

Page 3, column 2, line 37, delete ".weboutiner." and insert -- .weboutliner. --, therefor.

Signed and Sealed this
Fourteenth Day of October, 2014

Michelle K. Lee
*Deputy Director of the United States Patent and Trademark Office*